Aug. 26, 1941. J. C. J. STRAHAN Re. 21,889

HOSIERY

Original Filed June 9, 1938 2 Sheets-Sheet 1

INVENTOR.
JOSEPH G. J. STRAHAN

BY Glenn W. Brakenfell
ATTORNEYS

HOSIERY
Original Filed June 9, 1938 2 Sheets-Sheet 2
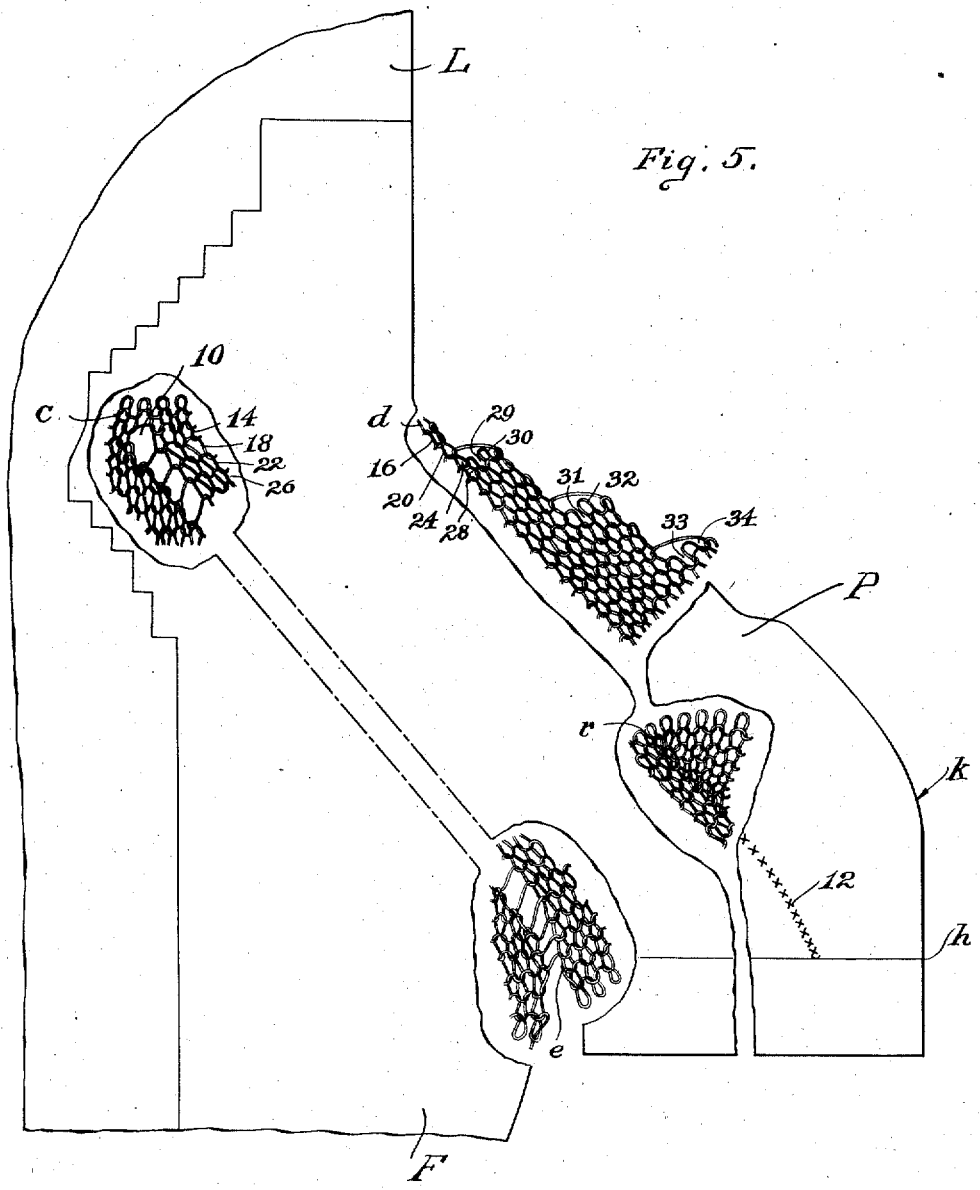
INVENTOR
JOSEPH C. J. STRAHAN
BY Gluck and Breitenfeld
ATTORNEYS Reissued Aug. 26, 1941 Re. 21,889

UNITED STATES PATENT OFFICE 21,889

HOSIERY

Joseph C. J. Strahan, New York, N. Y.

Original No. 2,236,584, dated April 1, 1941, Serial No. 212,711, June 9, 1938. Application for reissue June 19, 1941, Serial No. 398,855

9 Claims. (Cl. 66—187)

This invention relates generally to full fashioned hosiery, and to the method of its manufacture, and more particularly to the production of such hosiery by a single continuous process.

It will be understood that the full fashioned hosiery hereinafter referred to is the type of hosiery made on what is known as a flat bed machine and the term "full fashioned" as herein used will be understood to mean hosiery so made.

Full fashioned hosiery is generally made in what in effect is a two stage process requiring two separate machines. The leg portion is knitted with heel tabs on the legger and then transferred to a second machine called a footer, however, with the heel tabs turned 90° outwardly, so that their inner selvages, which on the legger were perpendicular to the last course of the leg portion, now form lateral prolongations thereof at their opposite ends. The knitting of the foot portion on the footer starts with a course of a length which includes not only the length of the last courses of the leg portion, but also that of the lateral prolongations thereof provided by said turned heel tabs.

The outer points of the last courses of the heel tabs as the leg portion comes off the legger becomes the outer point of the heel when the stocking is finished on the footer and seamed. The sole line which extends from the tip of the toe to this point of the heel therefore runs to the outside selvage of the turned heel and includes the length of the selvage of the foot portion (i. e. the portion added to the footer) plus the width of a heel tab.

The fit of the foot portion of the stocking depends upon the proper proportionality between the sole length (i. e. the length of the sole line) and the length along the median line (i. e. the distance along the top of the instep from transfer line to the tip of the toe) and in the aforementioned two machine process now generally employed, this proper proportionality has thus been approximately attained and a satisfactorily fitting foot portion provided.

The general objects of my invention are: an uninterrupted process for knitting full fashioned stockings having correctly proportioned foot portions; a process for knitting stockings which dispenses with the necessity for turning the heel tabs; an uninterrupted process for knitting full fashioned stockings in which a properly proportioned foot portion is attained without the necessity of turning the heel tabs; a process for knitting full fashioned stockings having properly fitting foot portions capable of being practiced on a single unit machine, and more particularly of being practiced without requiring the step of turning the heel tabs; and the provision generally of a full fashioned stocking so knit that a properly fitting foot portion is attained without turning of the heel tabs.

Such attempts as have been made to manufacture a stocking on a single unit machine and by a continuous process without turned heel tabs have proven failures for reasons that will be demonstrated in connection with the Thierfelder Patent No. 1,404,702 which is one example of such an attempt, and in the drawings of which Figure 2 shows the leg portion A knitted by the conventional two step process, *a—a* representing the transfer line and B—B the two heel tabs which are turned 90° on the footer.

In accordance with his process shown in Figure 4 Thierfelder knits his leg down to the course *a—a* of Figure 4 just as the knitting was performed to the corresponding line *a—a* in Figure 2 in the two step process, but, however, Thierfelder continutes the knitting process on the same unit with courses which run all the way across, said courses progressively and continuously widening by a transference of the loops at both ends until the course *c* is reached when the narrowing of the marginal loops is then begun and continued until line *y—y* is reached, thus producing what Thierfelder calls the heel rounding *c* which extends from *c'* to *c2*.

Now upon comparing Figures 4 and 6 of the Thierfelder process with Figure 2 of the conventional two unit process it will be observed that Thierfelder has lost from his sole line, the vertical distance from the point *d* in the line *y—y* of Figure 4 to the line *a—a* in that figure, because, whereas, in the two step process shown in Figure 2 of Thierfelder, the selvage of the foot portion knitted on the footer begins at the line *a—a* in that figure, the comparable portion of the selvage in Figure 4 of Thierfelder begins not at the corresponding line *a—a* in that figure, but at the line *y—y* thereabove. Therefore, in order to get a sole length in Thierfelder from the point *c* of the heel in Figure 6 to the point of the toe, which responds to a size such as 9½, Thierfelder must add to the length above the point *d*, the distance thus lost. In doing so, Thierfelder must of necessity add also correspondingly to the length of the median line of the foot portion along the instep. Therefore, a sole length, correct for a particular size, will in accordance with the Thierfelder teachings give a length along the instep which is entirely out of proportion to the sole line as these dimensions are established in the two step process, and therefore, will cause an excess of fabric at the instep and a puckering of the fabric at that point.

The patent to Wieland 1,746,846 and that to Hilscher 1,743,347 are two further examples of attempts which were unsuccessful for the same reason as was the Thierfelder attempt.

Hirschler apparently recognized the defect in the Thierfelder teachings and attempts to correct the defect by the addition of the triangular area to the heel portion defined by the point *fbh*. However, this Hilscher attempt was without effect because of his failure to realize the reason for the defect, which I will now point out.

These attempts fail either because they did not realize the fact that a process which dispenses with the turning of the heel tabs will of necessity result in a loss in the length of the sole line or because they were unable to contrive a method whereby such loss in the length of a sole line can be successfully compensated for without adding to the length of the median line along the instep.

I have attained the objects of my invention by devising a process whereby the aforementioned loss along the sole line is so compensated for as to give a foot portion correctly proportioned as between the length of a sole line and that of the aforementioned median line along the instep as determined from experience with stockings in the two unit machine.

While my process, like Thierfelder, contemplates starting the knitting at what is the transfer line in the two step process with courses all the way across that are progressively widened at both ends, unlike Thierfelder, the widening at the opposite outer edges is in process progressively greater than at the inner lines corresponding to the lines *d—b* in Thierfelder, and unlike Hilscher, this increased widening at the outer edges is continued to points laterally beyond the outer points *c* and *d* in Hilscher, a distance deemed sufficient for effecting the purpose of my invention, and it is at these laterally extended extreme outer points that the widening at the outer edge is discontinued to give the effect of the narrowing of the fabric. I have thus compensated for the aforementioned loss in sole length by adding to the width along the line *y—y* of Figure 4 of Thierfelder, so as to attain my increase between the points *d* and *c2* in Figure 4 of Thierfelder, thus lengthening the sole line.

Expressed in another way, Thierfelder compensated for the loss by adding to the longitudinal component (the length of the selvage of the foot portion), and correspondingly adding to the length of the aforementioned median line, whereas, in accordance with my process I have compensated for the loss by adding to the horizontal component of the fabric as it is on the frame of the machine and therefore without adding to the corresponding longitudinal component along the median line.

I have further discovered that by widening the fabric in the heel portions in the manner aforementioned, I get an increased elasticity due in part to this increased width, and in part to the direction of the wales and that therefore, instead of compensating for the aforementioned loss entirely by adding to the aforementioned width along the line *y—y* of Figure 4 of Thierfelder the full distance which was lost, I can make this added width somewhat less than is theoretically required and attain full compensation with the aid of this elasticity and in addition certain added advantages to be more fully pointed out.

The aforementioned objects and such objects as will hereinafter appear or be pointed out are attained by my invention, illustrative embodiments of which are disclosed in the drawings, wherein.

Figure 1:
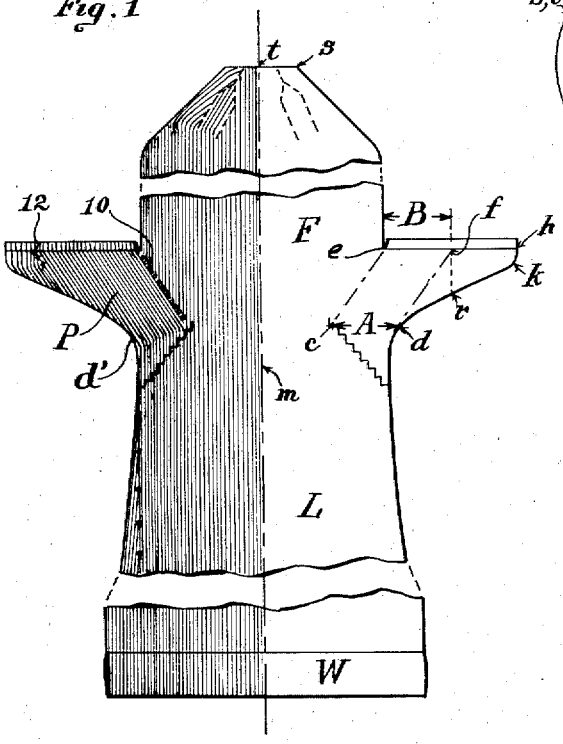
Figure 1 is a diagrammatic view of a stocking blank made in accordance with the principles of my invention, as it would appear while being knitted in the machine, and disregarding the distortion due to the yarn tension, which occurs when the fabric is released from the needles.
Figure 3:
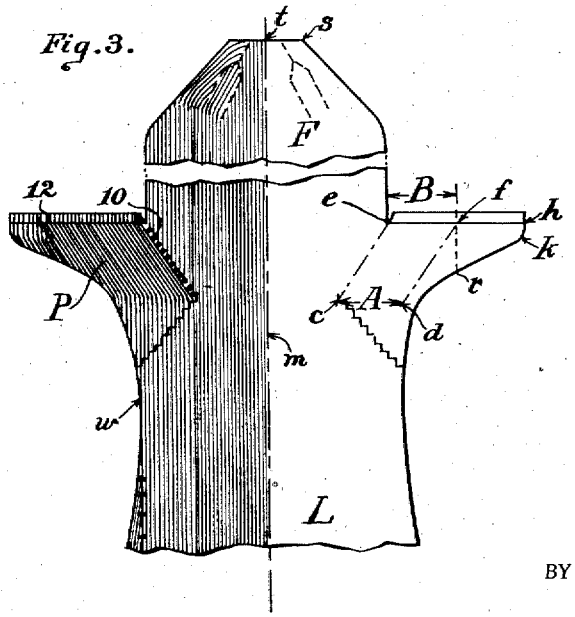
Figure 3 is a view, similar to Figure 1, of a second embodiment of my invention.
Figure 4:
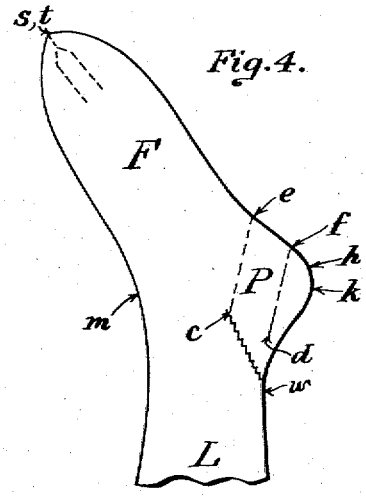

Figure 4 is a side elevational view of the lower portion of a stocking made from the blank of Figure 3; and Figure 5 is a view on an enlarged scale of a heel tab portion of the stocking blank of Figure 1, with portions thereof broken away, and with views of the detailed loop construction, as it would actually appear if magnified, inserted in said broken-away portions in their proper relative positions.

Referring now to the drawings in detail, and first of all to Figure 1, it will be observed that I have therein shown a stocking blank comprising a leg portion L, at the upper end of which is formed a welt portion W, and a foot portion F comprising instep and sole portions and laterally and oppositely extending heel portions P. Attention is invited particularly to the fact that the finished stocking blank has heel portions P formed without the turning of heel tabs.

Figure 2:
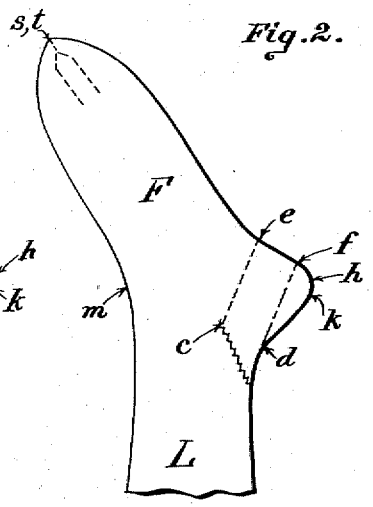
Figure 2 is a side elevational view of the lower portion of a stocking made from the blank of Figure 1.

The finished stocking resulting from the use of the blank of Figure 1 is shown in Figure 2.

In both of these figures the median line drawn from the instep or ankle to the toe commences at the point *m* and ends at the point *t*. The sole line runs along the outer edge of the foot portion from the point *s* to the point *e*, and continues in a transverse direction from the point *e* to the point of the heel *h*. It will be noted that in the finished stocking of Figure 2, the points *t* and *s* are coincident, as a result of the looping operation.

If a stocking is to fit the foot properly there must be a definite proportionality between the length of the median line *m—t* and the sole line *s—e—h* which calls for an increase in the latter over the former, which is attained in the practice now generally employed by turning the heel tabs as already above explained. It is further obvious that the girth of the stocking at the ankle is limited by the dimensions of the wearer's ankle. This girth may correspond in Figure 1 to the distance from the point *d'* to the point *d*.

Prior attempts to supply the increase in the sole length directed themselves to lengthening the foot portion F and of necessity increasing the length of the median line *m—t* as well as the length of the lines *s—e*.

This procedure which has hereinabove been referred to as lengthening the longitudinal component is therefore entirely ineffective to secure the result desired. According to my invention, therefore, I propose to lengthen the horizontal component *e—h* of the sole line. By so doing the length of the sole line *s—e—f—h* is increased by the distance from *f* to *h* without in any way affecting the length of the median line *m—t* or the ankle girth *m—d'*.

In order to obtain the increased length only of the horizontal component of the sole line, the following procedure may be adopted. After the leg portion L has been knitted to the line *d—m—d'* the knitting proceeds by the simultaneous knitting of the instep portion of the foot portion F and the heel portions P. The latter commence between the points designated *c* and *d*. The operation comprises knitting courses all the way across starting with the width from *d'* to *d* and widening the fabric by transferring the loops of successive courses outwardly on both sides along the line *ce* and the corresponding line on the other side, and simultaneously adding needles successively as the knitting progresses on the outermost ends of each heel portion so as to give the inclined selvage *dk*. This operation continues to the point *k* at which point the carriers are prevented from increased travel in the outer direction so as to terminate the widening of the fabric at that point but the outward transference of the loops along the line *c—e* still continues down to the line *e—h* at which point a loose course may be run in, ravel courses added, the heel portions pressed off and the knitting of the foot portion continued. It will be observed that the point *k*, that is the point at which the widening of the fabric ceases, is shown in the various figures as positioned outside of and beyond the point *f* so that when finished each of the heel portions extends to the point *h*, and the distance *f* to *h* will have been added to the width of the heel portions measured along the last course thereof.

It will be observed that the heel portion P therefore comprises an area *c—d—f—e* that is of parallelogram formation and the loops of which are transferred laterally, to the outside of which are positioned the triangular area *d—f—r* and also the area *k—h—f—r*, which represents a widening of the fabric and also a lengthening of the sole.

For purposes of comparison of my invention with the patents heretofore discussed, I have denoted the distance *c—d* by A and the distance *e—f* by B, and it will be observed that in my construction the distance *e—h* which represents the width of the end of the heel tab, and which is the aforementioned horizontal component of the sole length, greatly exceeds the distance B, which is equal to the distance A.

In the aforementioned patents the width of the heel tab at its end, and consequently, the horizontal component of the sole length, never exceeds the distance A. In most cases the disclosure shows the horizontal component of the sole length as less than B (=A). At most the disclosures show this horizontal component as equal to B (=A).

Mechanically expressed I may state that my invention contemplates the relation:

Horizontal component =B plus *fh*

In the prior art on the other hand:

Horizontal component ≦B

By using this construction I am enabled to make the distance *e—h*, that is B plus *f—h* of such length that the sole line *s—e—f* is greater than the median line *m—t*.

It is to be observed that the median line *m—t* may be considered as consisting of two portions, the first of which runs from the toe to the transverse course that bounds the heel tabs at their ends, while the second extends from this course to the point *m* in the instep. The first portion will be equal in length to the selvage *s—e* of the foot portion, because the number of courses traversing the median line and the selvage is the same, while the second portion, according to my teachings will be made less than *e—f* or B plus *f—h*. This latter construction is nowhere found in the prior art.

The left-hand side of Figure 1 comprises a diagrammatic indication of the direction of the wales. It will be observed that the inner transferred loop area of the teel tab portion *c—d—f—e* is separated from the foot portion A by a row of open-work loops indicated at 10, while a row of fashion marks is indicated at 12.

By referring to Figure 2 it will be observed that the finished stocking has a heel construction comprising a parallel-walled band *c—d—f—e*, and that to the right of the line *d—f* is a heel pocket *d—k—j—f*. The point *h*, marking the end of the sole line is positioned to the right of the line *d—f* and beyond the area *c—d—f—e*.

It follows from what has been said before, that in the prior art the point *h* will either coincide with the point *f* or will be located to the left thereof.

In the second embodiment of my invention as illustrated in Figures 3 and 4, I have indicated another manner of obtaining an added horizontal increment *f—h* for the sole length. In these figures similar letters and numerals have been used and it would be superfluous to repeat the detailed description thereof. It will be observed on comparison of Figures 3 and 4 with Figures 1 and 2, and the point *d* is no longer positioned on the margin of the blank or the edge of the stocking but is positioned some distance inward. The wale lines at the left of Figure 3 indicate how this effect can be obtained. It will be observed that whereas in Figure 1 the addition of extra wales commenced at the point *d*, simultaneously with the transferring operation, in Figure 3, the addition of extra wales commences at a point *w*, well in advance of the point at which the transferring commences. When the point *d* is reached the transferring operation commences and the addition of extra wales continues. In this manner the extra sole length *f—h* is obtained as before, while at the same time fullness is obtained at *d* and between the points *k* and *d*.

In Figure 5, which shows one of the heel tab portions P of the type shown in Figure 1 on an enlarged scale, one manner in which the widening of these portions is indicated in detail.

In this figure, as before, L denotes the leg portion, F the foot portion, and P the heel tab portion.

The last course of the leg portion extends substantially between the points *c* and *d*, and thereafter, to the right of the point C, the loops are shown transferred one needle to the right, while at the same time the wales of the foot section F are shown as increased, whereby the diagonal row of openwork loops is formed.

The courses including loops 14 and 16, 18 and 20 and 22 and 24, while having the loops thereof transferred, comprise the same number of loops as the course between the points *c* and *d*, but the next course 26 and 28 includes two extra loops, 29 and 30, obtained by increasing the travel of the yarn carrier by two extra needles, without however discontinuing the transferring operation. The next five courses are shown as bounded by the same wale, but in the next course the loops 31 and 32 indicate another increase in the number of loops and the widening of the heel tab by the addition of two extra wales.

This cycle may be continued as long as further widening of the heel tab portion is desired, and to indicate this I have shown the sixth course after the one containing the loops 31, 32 as having loops 33 and 34 added thereto.

At the point marked *r* the outer loops are no longer transferred, while transferring is continued for the inner loops, whereby the fashioning marks 12 result, and the width of the blank becomes constant, as indicated by the link *k*—*h*.

While in accordance with the theoretical practice of my invention the distance from *f* to *h* in Figure 1 should equal the loss in the length of the sole line by the one step process resulting as above explained, as a matter of fact this distance has been made shorter than that loss and I have done this purposefully because I find that as a result of my manner of knitting my stocking I get a compensation in another direction which supplements the partial compensation arrived at by the added width from *f* to *h* which gives me a full compensation in a more satisfactory manner. As a result of the added width and the manner of its formation as shown at the left in Figure 2 where the direction of the wales have been illustrated there is a greatly increased stretch in that portion of the fabric formed between the points *c* and *e* on the inside and the selvage on the outside thereof and that as a result of this increased stretch there will be provided not only a proportionality such as was my main objective but also a yieldability which will cause the stocking to hug the foot at the heel with a fit and a snugness not hitherto attainable so that thereby I attain this character of fit for the wide variation found in the human heel formation.

It is to be understood that the particular manner of widening hereinabove described is only one of the many ways that it may be effected, and that I have selected this particular manner merely because I have found it satisfactory in actual practice.

Having thus described my invention and illustrated its use, what I claim as new and desire to secure by Letters Patent is:

1. A full fashioned stocking blank having a foot portion and integral heel portions laterally positioned in relation to the foot portion and knitted integrally with the foot portion and said heel tabs being terminated by a course running transversely of the blank, and the sole length being composed of a free edge of the foot portion and a transverse component constituted by the outer transverse end of a heel tab, and said outer end of each heel tab being of greater length than the width of the heel tab at its inner end.

2. The process of knitting a fabric blank on a flat bed machine by a continuous process to form a full fashioned stocking, said process comprising knitting the heel portion and the foot portion in one continuous integral knitting operation and widening the fabric of the heel portion by a normal widening at the inner edge thereof by a transference of loops and additionally widening the fabric at the selvage by a progressive increase in needles continued to a point so as to give a heel portion width at the finish of the heel portion greater than that at the beginning of the heel portion and a blank width at the finish of the heel portion that is a maximum for the blank.

3. The process of knitting a fabric blank on a flat bed machine by a continuous process to form a full fashioned stocking, said process comprising knitting the heel portion and the foot portion by courses laid all the way across and widening the fabric of the heel portion by a normal widening at the inner edge thereof by a transference of loops and additionally widening of the fabric at the selvage by a progressive increase in needles continued to a point so as to give a heel portion width at the finish of the heel portion greater than that at the beginning of the heel portion and a blank width that is a maximum for the blank.

4. A full fashioned stocking with the foot, leg and heel portions knitted by a continuous process on a flat bed machine, said heel portions having the wales thereof diverging outwardly in the direction of the knitting and with the wales in one heel portion at an angle to the wales of the adjacent foot portion, the heel portions being given an excess of width at their outer ends over that of their inner ends and being terminated by a substantially transverse course, whereby to add to the length of the sole line by the excess width and whereby the elasticity of the heel section is increased to provide an increase in stretch, the effect of which is as if the sole line had been additionally increased and at the same time to more fully accommodate the variability in the human heel.

5. A full fashioned stocking blank adapted for being knitted in a single operation and on a single flat-bed machine, comprising a foot portion flanked by heel portions knitted integrally therewith and terminated by the end portions of a transverse course and the sole line of said blank being constituted by the selvage of said foot portion and by the transverse ends of said heel portions, said heel portions running in an outward direction from their inner or ankle portions toward their outer ends so that their wales lie at a steep angle to the wales of the foot portion and the adjacent boundaries of the foot portion diverging outwardly, and the width of each of said heel tabs increasing progressively from its inner or ankle ends towards its outer end throughout substantially its whole extent, such increase in width being obtained by the addition of wales and said blank having its maximum width at the ends of said heel portions.

6. The herein described process of knitting a blank for a full fashioned stocking by continuous and uninterrupted knitting on a single machine, which consists in knitting courses forming the leg portion, continuously knitting the foot portion comprising the instep and sole portions, and laterally and oppositely extending heel portions, the courses of said heel portions being knit integrally with and simultaneously with courses of the instep portion, and being knit of such length that the sole line extending from the point of the toe to the point of the heel is of greater length than the median line from the point of the toe to the instep.

7. A blank for a full fashioned stocking made of continuous and uninterrupted knitting and having a leg portion and a foot portion, said foot portion comprising sole and instep portions and oppositely and laterally extending heel portions, the courses of said heel portions being continuous with the courses of the instep portion, said heel portions having each an edge extending outwardly from the adjacent lateral edge of the sole portion to the outermost edge of the heel portion, the combined length of said edges of the sole and heel portions being greater than the length of the median line from the toe to the instep.

8. A full fashioned stocking formed of a blank made by continuous and uninterrupted knitting and having a leg portion, and a foot portion, said foot portion comprising sole and instep portions, and oppositely and laterally extending heel portions, the courses of said heel portions being continuous with courses of the instep portion, the sole line of the stocking extending from the toe to the point of the heel and comprising the union of the longitudinal edges of the sole portion and the laterally extending terminal edges of the heel portion, being of greater length than the median line from the toe to the instep.

9. A full fashioned stocking formed of a blank made by continuous and uninterrupted knitting and having a leg portion, and a foot portion, said foot portion comprising sole and instep portions and oppositely and laterally extending heel portions, the courses of said heel portions being continuous with courses of the instep portion and being of such length that the sole line of the stocking extending from the toe to the point of the heel is of greater length than the median line from the toe to the instep.

JOSEPH C. J. STRAHAN.